Oct. 30, 1956   B. N. MacGREGOR ET AL   2,768,428
APPARATUS FOR ASSEMBLING WIRING HARNESS
Filed Jan. 19, 1951   9 Sheets-Sheet 1

INVENTORS
BASIL N. MACGREGOR
AND CARL C. RIGSBY
BY Willits Hardman
and Feher
ATTORNEYS Oct. 30, 1956   B. N. MacGREGOR ET AL   2,768,428
APPARATUS FOR ASSEMBLING WIRING HARNESS
Filed Jan. 19, 1951   9 Sheets-Sheet 3

INVENTORS
BASIL N. MAC GREGOR
AND CARL C. RIGSBY
BY
ATTORNEYS

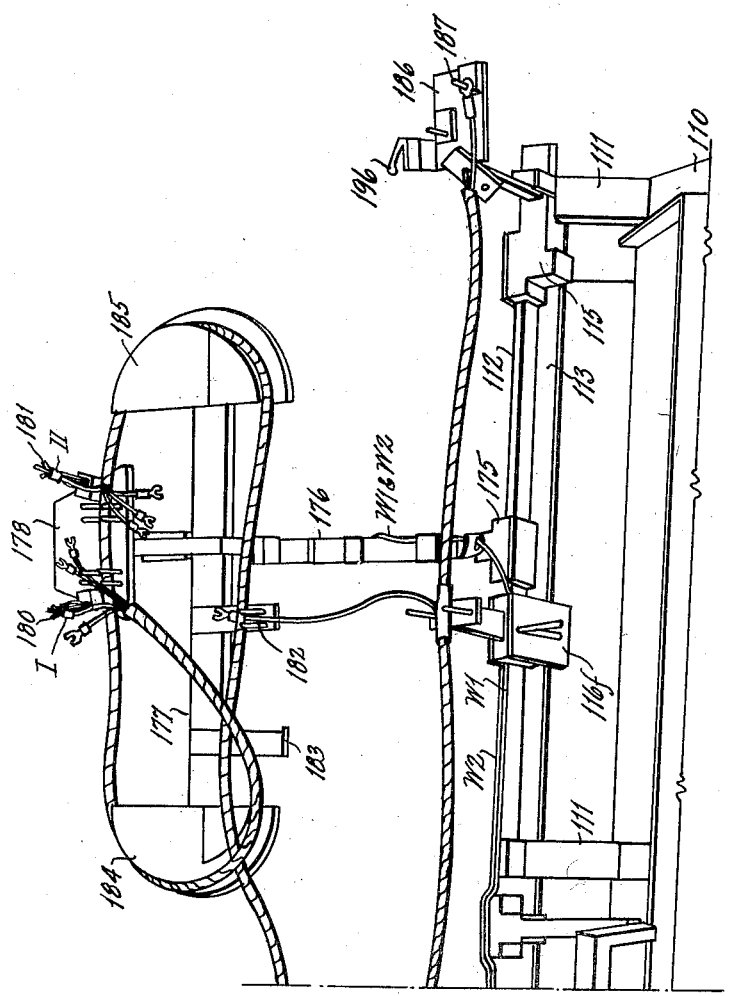

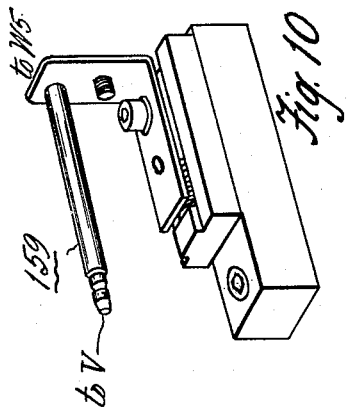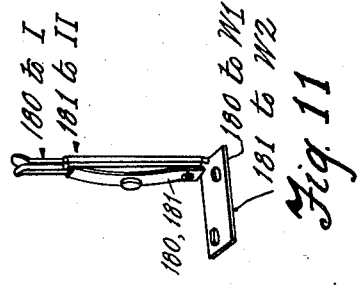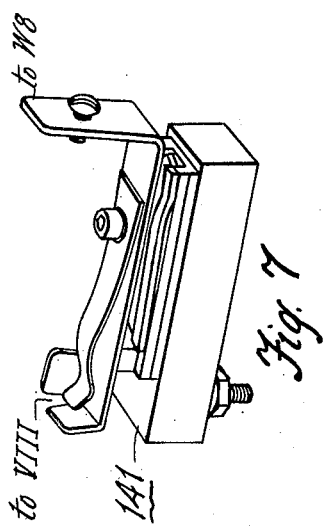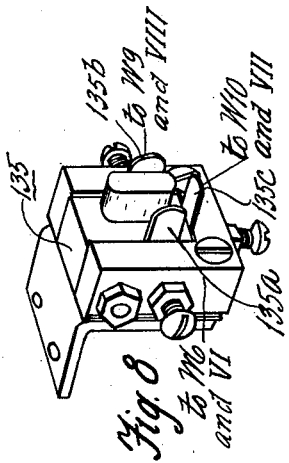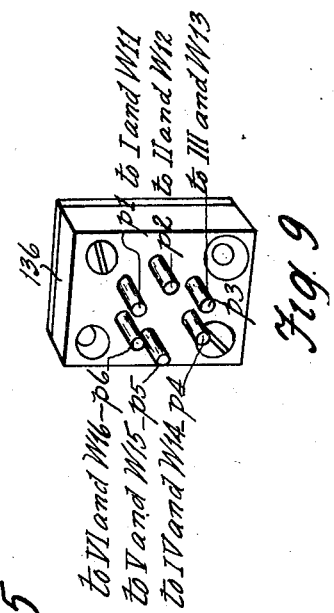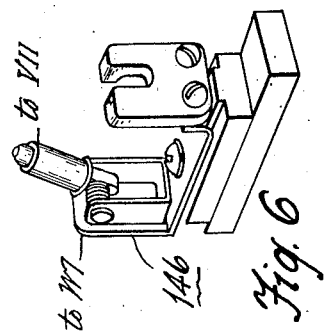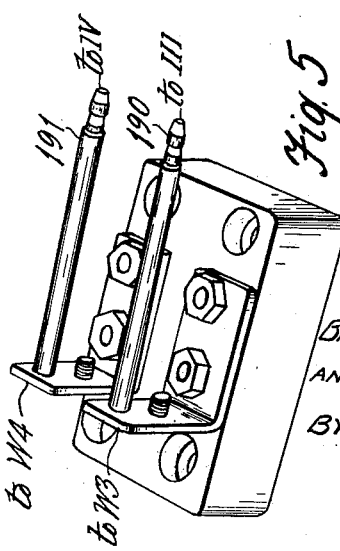

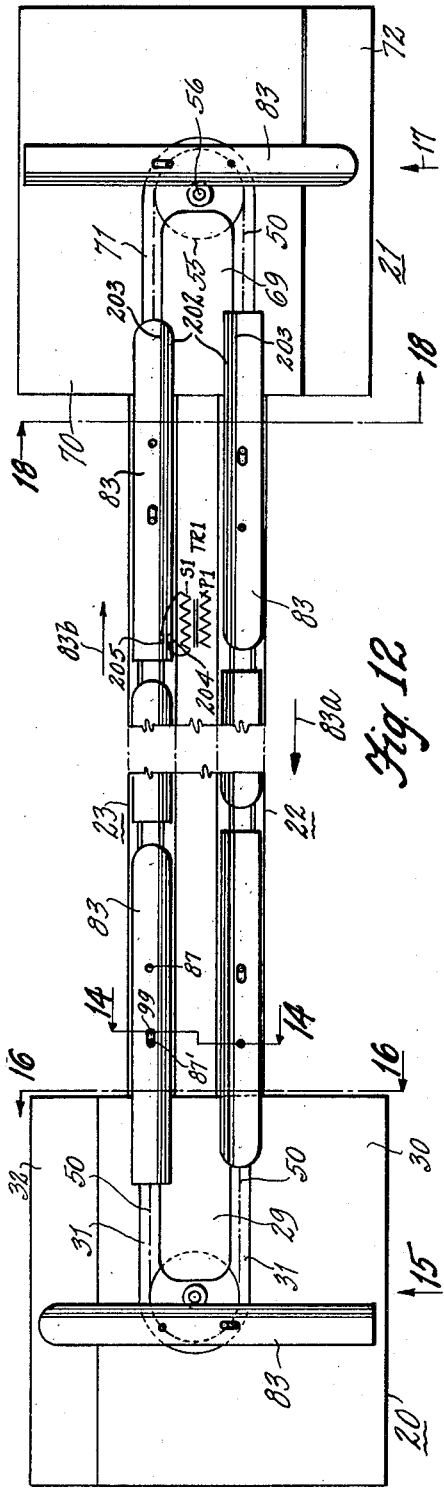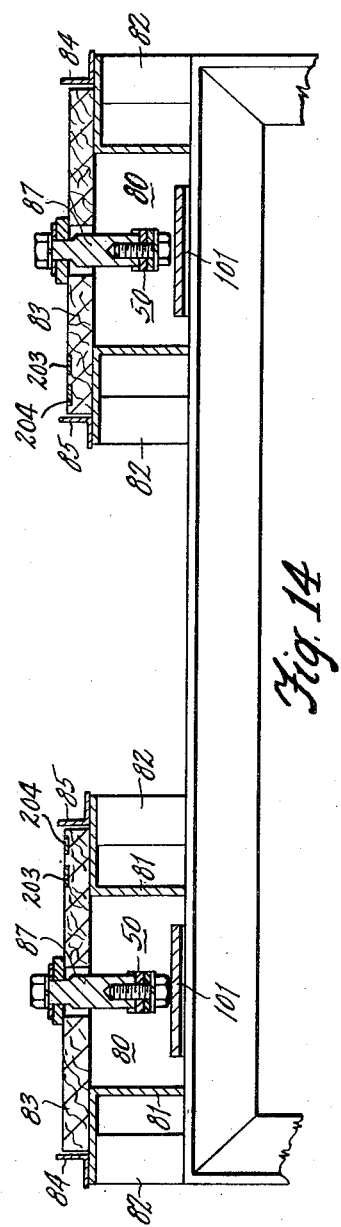

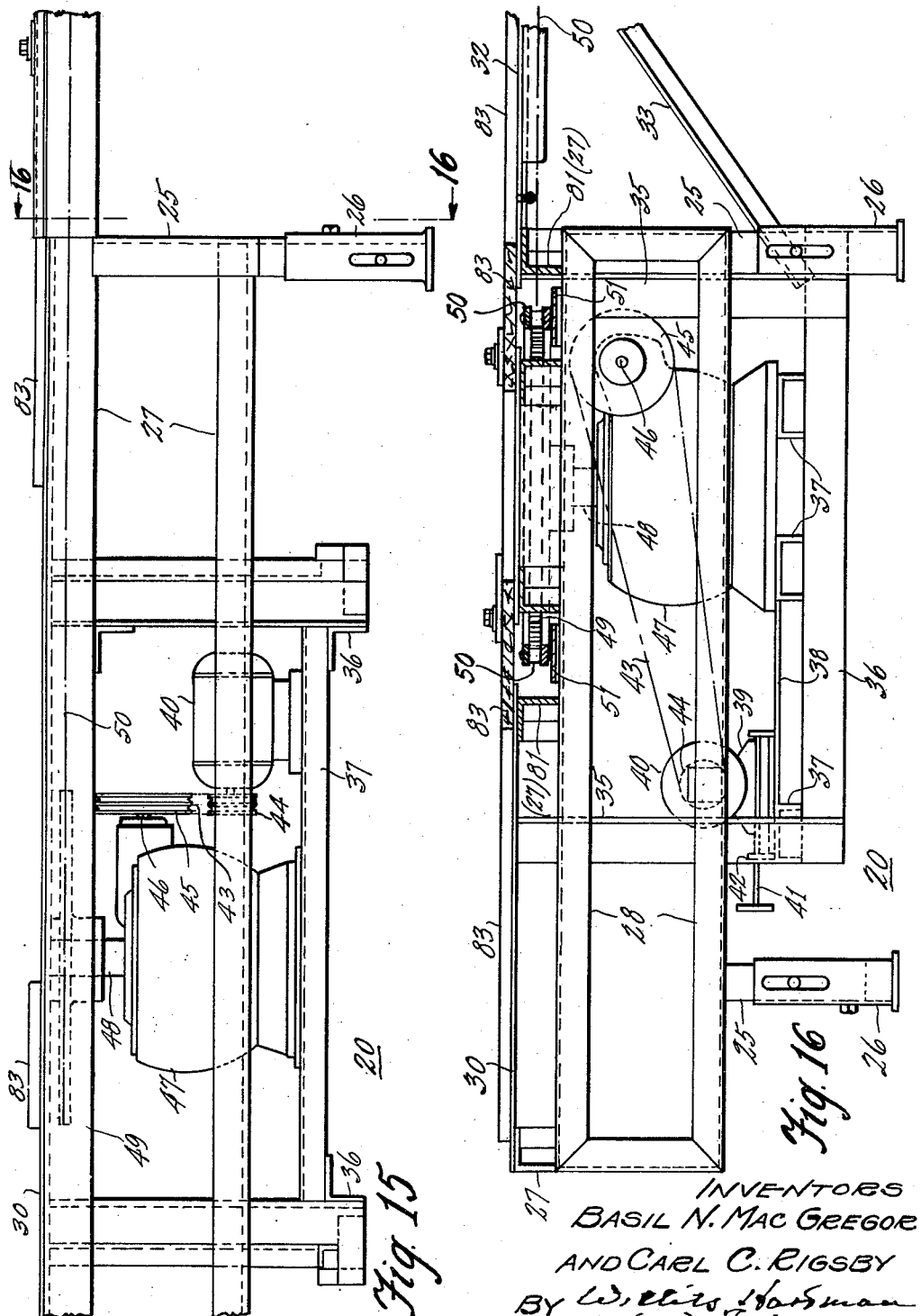

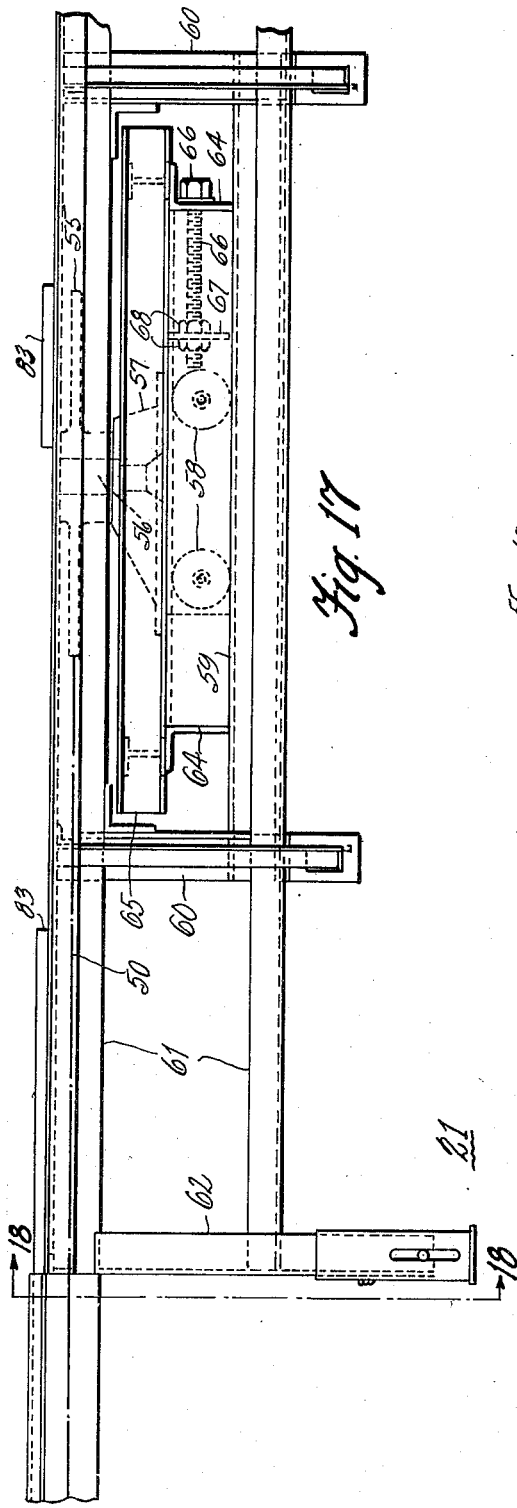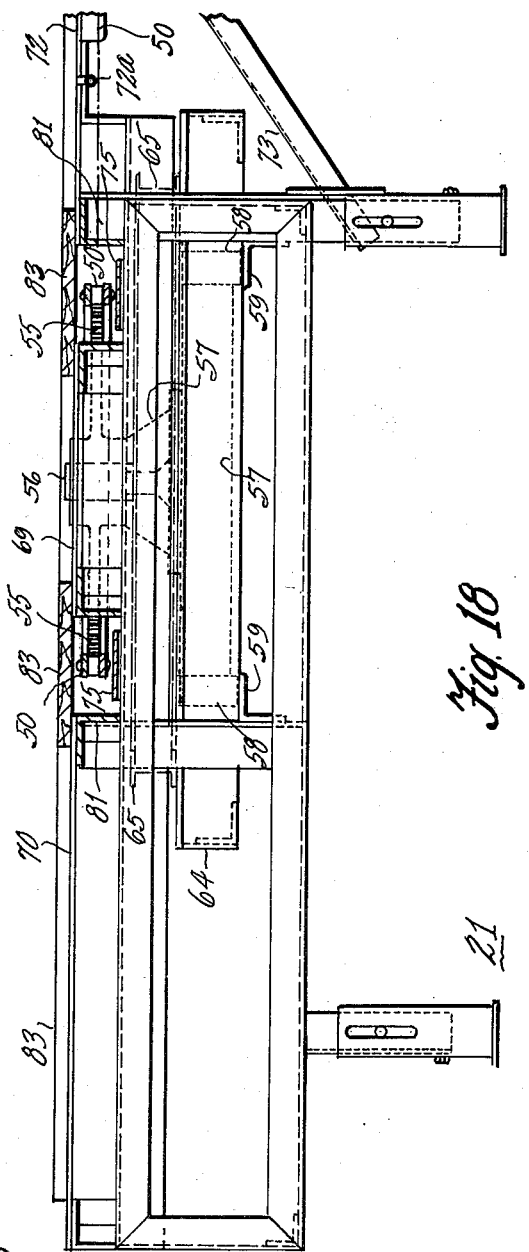

Oct. 30, 1956  B. N. MacGREGOR ET AL  2,768,428
APPARATUS FOR ASSEMBLING WIRING HARNESS
Filed Jan. 19, 1951  9 Sheets-Sheet 9

INVENTORS
BASIL N. MacGREGOR
AND CARL C. RIGSBY

BY
ATTORNEYS

United States Patent Office 2,768,428
Patented Oct. 30, 1956

2,768,428

APPARATUS FOR ASSEMBLING WIRING HARNESS

Basil N. MacGregor and Carl C. Rigsby, Warren, Ohio, assignors to General Motors Corporation, Detroit, Mich., a corporation of Delaware Application January 19, 1951, Serial No. 206,778

4 Claims. (Cl. 29—203)

This invention relates to the manufacture of wiring harnesses for automotive vehicles and its primary object is to facilitate the progressive assembling of wiring harnesses and the wrapping of such harnesses with tape to hold the wires in proper position. To accomplish this object, the invention provides a plurality of assembling racks which are moved by a conveyor so that the racks pass in succession within convenient reach of workers who respectively assemble certain wires on these racks and wrap the wires with tape so as to hold the wires together in the desired position.

A further object of the invention is to provide for electrically testing certain circuits of the wiring harnesses while assembled on the racks and while the racks are moving.

Further objects and advantages of the present invention will be apparent from the following description, reference being had to the accompanying drawings wherein a preferred embodiment of the present invention is clearly shown.

In the drawings:

Figs. 1 and 2 together constitute a perspective view of one of the assembling racks before any wires of the harness are assembled thereon.

Figure 3:
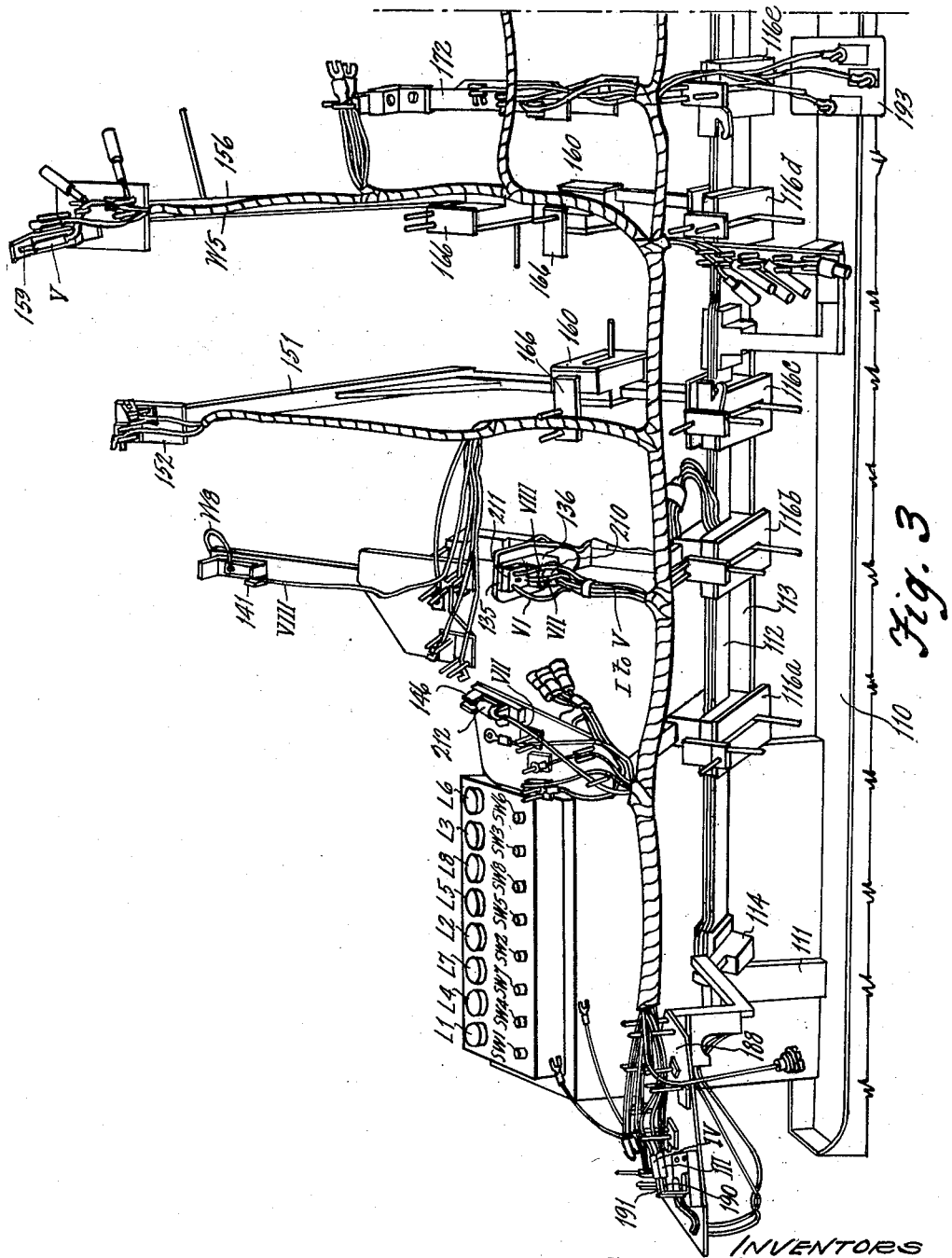

Figs. 3 and 4 together constitute a perspective view of a rack with a completed wiring harness thereon.

Figs. 5 to 11 are perspective views of devices for making electric connection with certain wires of the harness for the purpose of electrical test.

Fig. 12 is a plan view of the wiring harness rack conveyor.

Fig. 13 is a side view of the conveyor.

Fig. 14 is an enlarged sectional view on line 14—14 of Fig. 12.

Fig. 15 is an enlarged scale, fragmentary side view in the direction of arrow 15 of Fig. 12.

Fig. 16 is a sectional view on line 16—16 of Figs. 12 and 15.

Fig. 17 is an enlarged fragmentary side view in the direction of arrow 17 of Fig. 12.

Fig. 18 is a sectional view on line 18—18 of Figs. 12 and 17.

Figure 19:
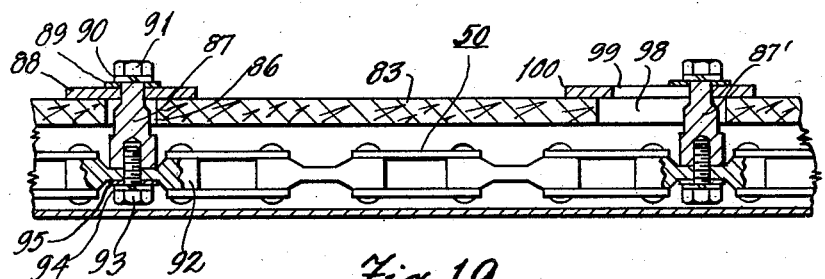

Fig. 19 is an enlarged sectional view on line 19—19 of Fig. 14.

Figure 20:
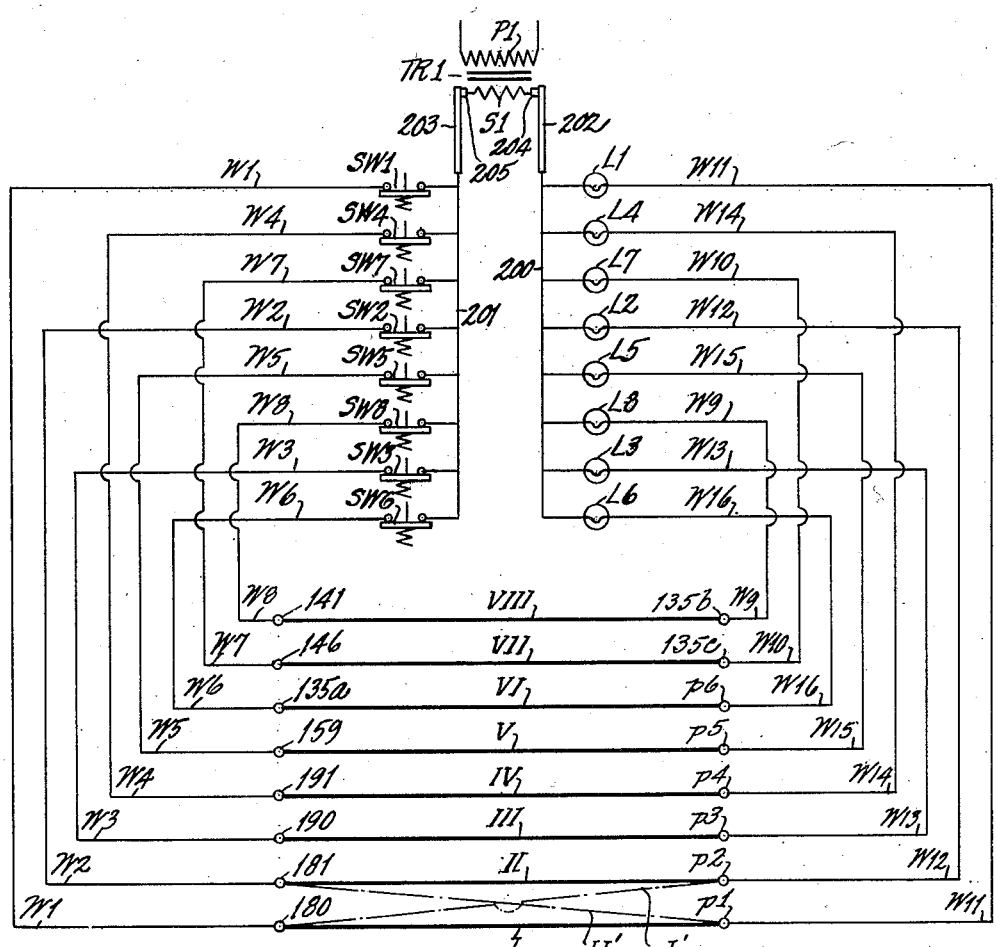

Fig. 20 is a wiring diagram of the test circuits.

Referring to Figs. 12 and 13, the frame work of the apparatus comprises a table 20, a table 21 and connecting track portions 22 and 23.

Referring to Figs. 12, 15 and 16, the table 20 comprises corner posts 25 which are vertically adjustable relative to supporting feet 26. Posts 25 support horizontal members 27 (Fig. 15) and horizontal members 28 (Fig. 16). Members 27 directly support table top members 29 and 30 spaced by a channel 31 which provides clearance for parts connected with a conveyor chain. The area of table plate 30 is augmented by an apron plate 32 hingedly connected with the frame of table 20 and secured in horizontal position by braces 33 (Fig. 16). Vertical bars 35 of the table frame support angles 36 which support channel bars 37 and a plate 38 on which a frame 39 of an electric motor 40 is adjustable by turning a screw 41 threaded through a fixed plate 42 for the purpose of taking up slack in a belt 43 connecting motor driven pulley 44 with a pulley 45 connected with a driving shaft 46 of a speed reducer contained in a housing 47 supported by channel bars 37. The output shaft 48 of the speed reducer is connected with a sprocket 49 engaged by a conveyor chain 50 which, in Fig. 12, is represented by the dot-dash line. As the chain 50 passes around sprocket 49, it is supported by a plate 51.

Referring to Fig. 17, chain 50 passes around an idle sprocket 55 fixed to a shaft 56 journaled in a bearing member 57 supported by trunnions 58 which engage track members 59 supported by vertical angles 60 supported by horizontal angles 61 supported upon the posts 62 of the frame of the table 21 which is constructed in a manner similar to the frame of table 20. Track members 59 support angles 64 which support channels 65 which guide the bearing member 57 for horizontal movement and maintain alignment of conveyor chain 50 with workholder tracks to be described. In order to take up slack in conveyor chain 50, there is provided a screw 66 which passes through the angle 64 and through a plate 67 connected with bearing member 57. Nuts 68 engaged by screws 66 can be turned for adjusting the spacing of plate 67 relative to the angle 64. The frame of table 21 supports table plates 69 and 70 (Fig. 12) which are spaced to provide a channel 71 to provide clearance with parts connected with the conveyor chain 50. The area of table 70 is augmented by an apron 72 connected by hinges 72a with the table frame and supported in vertical position by braces 73. As the chain passes around sprocket 55, it is supported by plate 75 (Fig. 18).

The channel 31 of table 20 (Fig. 12) and the channel 71 of table unit 21 are connected with two channels 80 (Fig. 14) between two angles 81 supported by bars 82 supported at their ends by the frames of the table units. Each pair of angles 81 provides for the support of pallets 83 made preferably of wood and guided for movement upon the angles 81 by angles 84.

Referring to Fig. 19, each pallet 83 has a round hole 86 which receives a rod 87, the upper end of which extends through a metal plate 88 attached to the pallet through a washer 89 and a lock washer 90. Rod 87 has a nut 91 threaded on its upper end above the washer 90. Rod 87 is attached to a link 92 of conveyor chain 50 by a screw 93 which passes through a lock washer 94, a plain washer 95, link 92 and is screwed into the lower end of rod 87. Each pallet is provided with a slot 98 in alignment with a slot 99 of a plate 100 attached to the pallet. Plate 100 like plate 88, receives a rod 87' connected with a chain link 92' in a manner similar to the connection of rod 87 with chain link 92. As the chain 50 moves a pallet around a chain sprocket, as shown in Fig. 12, the distance between rods 87 and 87' decreases. Therefore, the slots 98 and 99 are provided in order that rod 87' may move closer to rod 87 while a pallet is being turned around as indicated in Fig. 12. Plates 101 (Fig. 14) receive lubricant which may drip from the chain 50.

Figure 1:
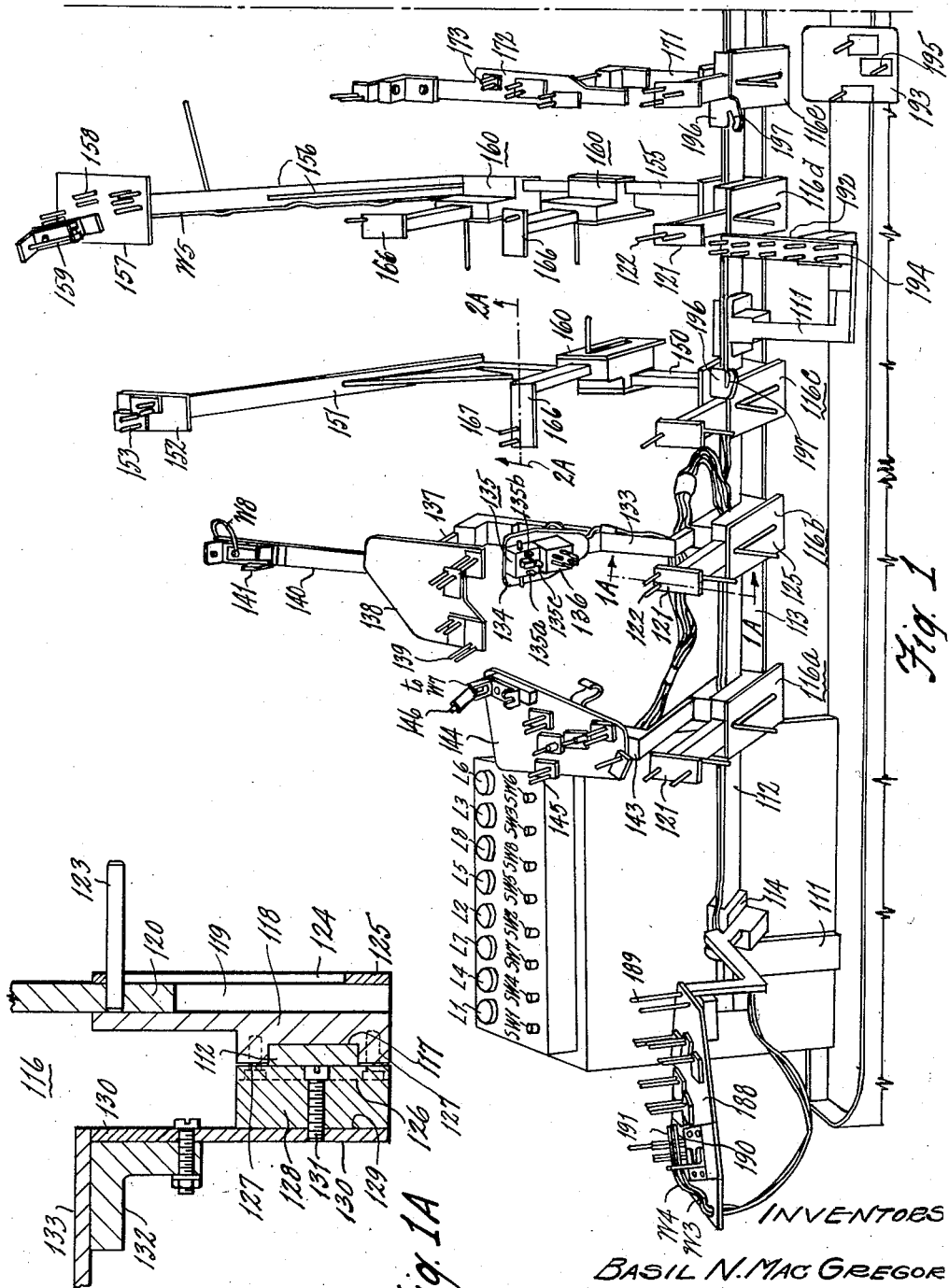
Fig. 1A is a fragmentary sectional view on an enlarged scale on line 1A—1A of Fig. 1.
Figure 2:
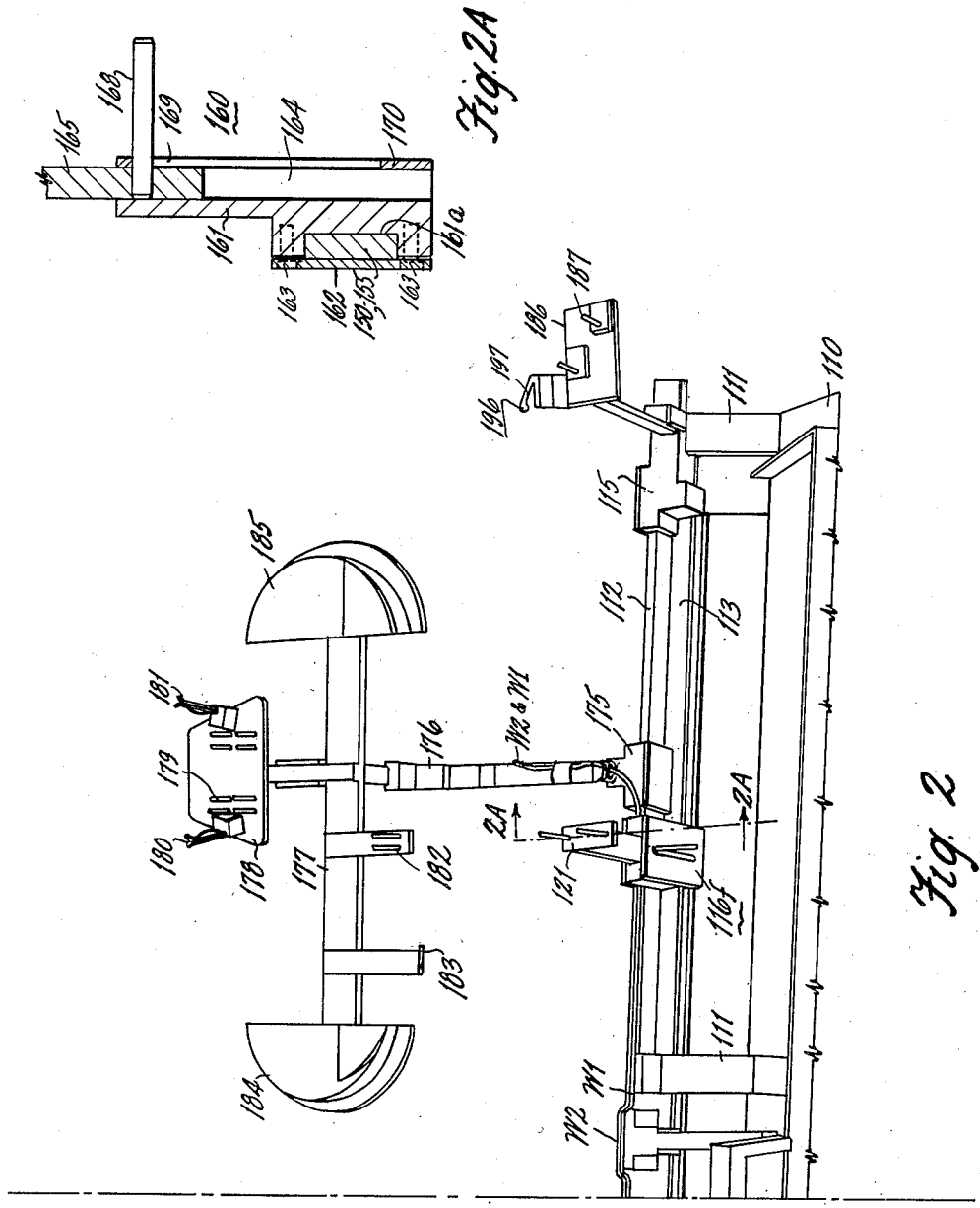
Fig. 2A is a fragmentary sectional view on lines 2A—2A of Figs. 1 and 2.

The pallets 83 (Fig. 12) which move continuously, first in the direction of arrow 83a and then in the direction of arrow 83b, each carry a wiring harness assembling rack (Figs. 1 and 2). These racks are constructed to meet the assembling requirements of a particular wiring harness. Each rack comprises a base plate 110 which supports brackets 111 which support horizontal bars 112 and 113 along which end brackets 114 and 115 and similar intermediate brackets 116a-b-c-d-e-f can be fixed in adjusted position.

Fig. 1A illustrates a typical construction of brackets 116, one of which is 116b (Fig. 1). Bar 112 is received by a groove 117 of a plate 118 which has a groove 119 in which a bar 120 is received which, as shown in Fig. 1, supports a pad 121 (Fig. 1) having locating pins 122 extending upwardly therefrom. By manipulating of a rod 123 (Fig. 1A) connected with bar 120 and passing through a slot 124 in a plate 125, the pad 121 can be lifted into the position shown in Fig. 1 or it can be lowered as shown in Fig. 3 to facilitate the taping operation after the assembly of wires. Bar 120 is retained in its upper position by engagement of a small ball detent (not shown) which is mounted on the bar and engages a fixed part of the device. Bar 118 is retained in adjusted position by a plate 126 which screws 127 fix to plate 118. The tightening of the screws pinches the bar 112 between plates 118 and 126. Plate 118 is provided with a boss 128 which has a groove 129 for receiving a plate 130 attached to boss 128 by screw 131. Plate 130 has secured thereto by a screw a supporting member 132 which, in the case of supporting bracket 116b, supports an arm 133 (Fig. 1). Arm 133 supports a pad 134 on which are positioned a plug member 135 (Fig. 8) and a plug member 136 (Fig. 9). Arm 133 (Fig. 1) also supports a bar 137 which supports a pad 138 from which locating pins 139 project. Pad 138 supports a bar 140 which carries a socket member 141 (Fig. 7).

Bracket 116a (Fig. 1) which is constructed like bracket 116b, supports an arm 143 which is generally similar to arm 133 and supports a pad 144 from which locating pins 145 project and an insulated plug 146 (Fig. 6).

Bracket 116c supports a bar 150 carrying a bracket 151, having an upwardly extending standard supporting a pad 152 from which locating pins 153 extend.

Bracket 116d supports a bar 155 which carries a bracket 156 also having an upwardly extending standard supporting a pad 157 from which locating pins 158 project and on which is mounted an insulated plug 159 (Fig. 10).

Each of the bars 150, 155 supports a similar bracket 160. As shown in Fig. 2A, each bracket 160 comprises a plate 161 having a groove 161a for receiving the bar 150 or 155. Plate 161 is retained in adjusted position along the bar by a plate 162 secured by screws 163. Each plate 161 has a groove 164 which receives a bar 165 on which is mounted a pad 166 supporting one or more locating pins 167. The bar 165 is raised into position shown in Fig. 1 or lowered into the position shown in Fig. 4 by the manipulation of a rod 168 attached to plate 165 and extending through a slot 169 in a plate 170 attached to bar 161. Plate 165 is retained in upper position by the frictional engagement of the bar with the plate 170.

Bracket 116e supports an arm 171 which carries a pad 172 supporting locating pins 173.

Referring to Fig. 2, a bracket 175, retained in adjusted position along the long bar 112 by means similar to that used with brackets 116, supports an arm 176 which supports a bar 177 and carried by this bar is a pad 178 from which locating pins 179 project and on which are mounted insulated socket members 180 and 181 (Fig. 11). The bar 177 also supports locating pins 182, a retainer plate 183 and two wooden wire supporting pads 184 and 185. Right end bracket 115 supports a pad 186 from which locating pins 187 extend. Left end bracket 114 supports a pad 188 supporting locating pins 189 and insulated plugs 190 and 191 (Fig. 5). Base plate 110 supports pads 192 and 193 on which are projecting pins 194 and 195 respectively.

There are notched clips 196 (Figs. 1 and 2) provided with cutting edges 197 which are located in convenient reach of persons who wind tape around the wires so as to facilitate cutting the tape after a wrapping operation.

The wiring harness 200, as shown in complete form in Figs. 3 and 4, is progressively assembled by persons, each of whom mount certain wires and their terminals upon or between certain retainer pins or other retaining devices and connect certain wire terminals with certain ones of the plug or socket members, shown in Figs. 5–11. As the assembling progresses to a point where the taping of the wires of the harness can be performed, the pads 121 of brackets 116a, b, c, d, e and f are lowered and the pads 166 of brackets 160 are lowered at different times to facilitate the taping operation.

Referring to Fig. 20, the test circuit of each assembly rack includes wires 200 and 201 connected respectively with bars 202 and 203 which, as the pallet 83 moves past a test station, are engaged respectively by brushes 204 and 205 connected with a secondary coil S1 of a transformer TR1 whose primary coil P1 is connected with an A. C. source.

Wire 200 is connected with lamps L1, L4, L7, L2, L5, L8, L3, L6 connected respectively with W11, W14, W10, W12, W15, W9, W13, W16 connected respectively with prongs p1 and p4 of plug 136 (Fig. 9), prong 135c of plug 135 (Fig. 8), prongs p2 and p5 of plug 136, prong 135b of plug 135, prongs 3 and 6 of plug 136.

Wire 201 is connected with normally closed push button switches SW1, SW4, SW7, SW2, SW5, SW8, SW3, SW6 which are located as shown in Fig. 3 adjacent to lamps L1, L4, L7, L2, L5, L8, L3 and L6, respectively, and which are connected with wire W1, W4, W7, W2, W5, W8, W3 and W6 connected respectively, with socket 180 (Fig. 11), plug 191 (Fig. 5), plug 146 (Fig. 6), socket 181 (Fig. 11), plug 159 (Fig. 10), socket 141 (Fig. 7), plug 190 (Fig. 5) and prong 135a of plug 135, (Fig. 8).

The wires of the wiring harness which are connected into the test circuits are indicated diagrammatically in Fig. 20 by lines marked I to VIII respectively. Parts of these wires appear in Fig. 3. Wires I to VI are connected respectively, each at one end with the proper sockets of a plug 210 (Fig. 3) so as to be connected respectively with prongs p1 to p6 of plug 136 (Fig. 9). The other ends of wires I to VI are connected respectively with suitable sockets or plugs which are connected with connecting members or plugs 180, 181, 190, 191, 159 135a respectively when the wiring harness is assembled. One end of harness wire VII is connected with a socket which receives plug prong 135c and the other end of this wire is connected with a socket which receives plug 146. One end of harness wire VIII is connected with a socket which receives plug prong 135b and the other end of this wire is connected with a terminal received by socket 141. The sockets which, respectively, are to receive plug prongs 135, 135b, 135c are part of a socket unit 211 (Fig. 3). Socket 212 (Fig. 3) receives plug 146 (Fig. 6). The assembling of socket units 210, 211 and 212 with harness wires is done before the wiring harness is completely assembled. The purpose of the test is to determine whether the sockets of these socket units have been connected with the proper wires.

When the harness assembly rack arrives at the test station, all eight lamps L1 to L8 will burn since bars 202 and 203 on the supporting pallet are engaged by brushes 204 and 205 respectively (Fig. 12). If the eight harness wires I to VIII have been properly connected, lamps L1 to L8 will not burn when switches SW1 to SW8, respectively, are opened. If any of the eight harness wires have been improperly connected with sockets of multi-socket units 210 and 211, in particular, the lamps associated with the misconnected wires will not go out when the switches associated therewith are opened. For example, if wires I and II had been respectively misconnected with sockets of unit 210 which receive plug prongs p2 and p1 as indicated at I' and II', when switch SW1 is opened lamp 1 does not go out because it is connected through wire II at II', wire W2, switch SW2 and wire 201 with transformer coil S1. Also, when switch SW2 is opened, lamp L2 does not go out because it is connected through wire I at I', wire W1, switch SW1 and wire 201 with transformer coil S1. If there are no other misconnections, lamps L4, L7, L5, L8, L3, L6 go out when adjacent switches SW4, SW7, SW5, SW8, SW3, SW6 are opened. This particular test, for example, shows misconnection of wires I and II. The person performing the test observes whether wires I and II have been connected with sockets 180 and 181 respectively, as shown in Fig. 4. If properly connected, the test indicates misconnection to socket unit 210 and the harness is so tagged before removal from the harness rack. After removal, the misconnection is corrected. The same test indication would result if wires I and II had been properly connected with socket unit 210, but had been connected with sockets 181 and 183 respectively. Reversal of these connections would result in the harness passing the tests for wires I and II. It seldom happens that the individual terminal members of any of wires I to VIII are improperly connected into the test circuits since trained assemblers can easily distinguish them by their braid color or design or by their length. The assembling operations are allocated to people who are trained to assemble certain particular wires on the harness rack. Each wire has a particular place on the rack and the person who is trained to assemble that wire knows where to place it.

The testing apparatus is used more particularly to check for misconnections of wires with sockets of multiple-socket units, such as units 210 and 211 which are received respectively by multiple prong plug unit 136 and 135 respectively (Figs. 9 and 8). Obviously these plugs and sockets are so designed that they will fit together only in one manner. No difficulty arises in properly connecting socket 212 (Fig. 3) with plug 146 (Fig. 6).

Fig. 12 shows each rack pallet 83 provided with the bars 202 and 203 respectively engaged by brushes 204 and 205 connected with secondary coil S1 of transformer TR1. For sake of clarity, the assembly racks are omitted from the pallets 83 in Figs. 12–19.

From the foregoing description, it is apparent that the present machine includes a continuously moving endless chain conveyor which moves assembly racks along a straight track in one direction, turns the racks 180° and moves them along a second track parallel to the first track and in the opposite direction. During these movements of the rack along the tracks, single wires with terminals attached and groups of wires attached to multiple socket units are progressively assembled and taped and the connections of certain wires are tested. Then the completed harness is removed from the rack before it is turned 180° by the conveyor and is returned to the starting point of the first track. Along the tracks there are located fixed racks supporting single wires or wire assemblies in convenient reach of the persons who are trained to assemble particular wires or wire assemblies in particular positions on the assembling rack as it moves past them.

While the embodiment of the present invention as herein disclosed, constitutes a preferred form, it is to be understood that other forms might be adopted.

What is claimed is as follows:

1. An apparatus for use in assembling and taping together a plurality of wires of different length and which are adapted to be located in predetermined positions relative to each other so as to form a wiring harness for automotive vehicles or the like, comprising a plurality of supporting members adapted to be carried by a conveyor each of which supports a rack for holding the wires of said harness in proper position to be taped, each of said racks including a substantially horizontal bar, a plurality of wire supporting standards of different lengths extending upwardly from said horizontal bar, brackets adjustably mounted on said horizontal bar for supporting the wire supporting standards and movable to different positions along said bar, means for holding the brackets in any adjusted position, said wire supporting standards extending upwardly from said brackets and adjustably supported thereby so that they may be raised or lowered, and means for holding the standards in any adjusted position on said brackets.

2. An apparatus for use in assembling and taping together a plurality of wires of different lengths and which are adapted to be located in predetermined positions relative to each other so as to form a wiring harness for automotive vehicles or the like, comprising a plurality of supporting members adapted to be carried by a conveyor each of which supports a rack for holding the wires of said harness in proper position to be taped, each of said racks including a substantially horizontal bar, brackets adjustably mounted on said horizontal bar and movable to different positions along said bar, means for holding the brackets in any adjusted position, a plurality of wire supporting standards of different lengths extending upwardly from said brackets and adjustably supported thereby, said supporting standards being angular in form and movable in the supporting brackets at an angle to the vertical whereby as the standards are adjusted in the supporting brackets the upper ends thereof are moved toward and away from the front of the apparatus as well as upwardly and downwardly, and means for holding the standards in any adjusted position on said brackets.

3. An apparatus for use in assembling and taping together a plurality of wires of different length and which are adapted to be located in predetermined positions relative to each other so as to form a wiring harness for automotive vehicles or the like, comprising a plurality of supporting members each of which supports a rack for holding the wires of said harness in proper position to be taped, each of said racks including a substantially horizontal bar, brackets adjustably mounted on said horizontal bar and movable to different positions along said bar, means for holding the brackets in any adjusted position, a plurality of wire supporting standards of different lengths extending upwardly from said brackets and adjustably supported threby, said supporting standards being angular in form and movable in the supporting brackets at an angle to the vertical whereby as the standards are adjusted in the supporting brackets the upper ends thereof are moved toward and away from the front of the apparatus as well as upwardly and downwardly, a plurality of wire holding members extending from said standards at different positions thereon, means for holding the standards in any adjusted position on said brackets, said supporting means being adapted to be carried by a conveyor to bring each of the wire supporting racks successively within reach of each of a plurality of workers so as to permit the workers to position the wires on said racks and tape the wires together while held in position on the rack.

4. An apparatus for use in assembling and taping together a plurality of wires of different length and which are adapted to be located in predetermined positions relative to each other so as to form a wiring harness for automotive vehicles or the like, comprising a plurality of supporting members each of which supports a rack for holding the wires of said harness in proper position to be taped, each of said racks including a substantially horizontal bar, brackets adjustably mounted on said horizontal bar and movable to different positions along said bar, means for holding the brackets in any adjusted position, a plurality of wire supporting standards of different lengths extending upwardly from said brackets and adjustably supported thereby, said supporting standards being angular in form and movable in the supporting brackets at an angle to the vertical whereby as the standards are adjusted in the supporting brackets the upper ends thereof are moved toward and away from the front of the apparatus as well as upwardly and downwardly, a plurality of wire holding members extending from said standards at different positions thereon some of said members being positioned at the upper end thereof, means for holding the standards in any adjusted position on said brackets, said supporting members being adapted to be carried by a conveyor to bring each of the wire supporting racks successively within reach of each of a plurality of workers so as to permit the workers to position the wires on said racks and tape the wires together while held in position on the rack.

References Cited in the file of this patent

UNITED STATES PATENTS

| | | |
|---|---|---|
| 360,463 | Palmenberg | Apr. 5, 1887 |
| 873,674 | Miller | Dec. 10, 1907 |
| 1,334,704 | Kubasta | Mar. 23, 1920 |
| 1,546,392 | McCurdy | July 21, 1925 |
| 1,664,221 | Matthews et al. | Mar. 27, 1928 |
| 1,760,538 | Becker | May 27, 1930 |
| 1,999,657 | Heath | Apr. 30, 1935 |
| 2,094,024 | Reichiert | Sept. 28, 1937 |
| 2,264,408 | Rohr et al. | Dec. 2, 1941 |
| 2,351,276 | Malhiot | June 13, 1944 |
| 2,393,397 | Mullarkey | Jan. 22, 1946 |
| 2,514,104 | Sutherland | July 4, 1950 |